June 5, 1962 E. F. JOHNSON 3,037,922
HEAT TRANSFER AND TRITIUM PRODUCING SYSTEM
Filed April 14, 1959 2 Sheets-Sheet 1

SPACE BETWEEN COILS FOR ACCESS TO BLANKET

MAGNET COILS

INVENTOR.
ERNEST F. JOHNSON
BY

June 5, 1962 E. F. JOHNSON 3,037,922
HEAT TRANSFER AND TRITIUM PRODUCING SYSTEM
Filed April 14, 1959 2 Sheets-Sheet 2

INVENTOR.
ERNEST F. JOHNSON 3,037,922
HEAT TRANSFER AND TRITIUM PRODUCING SYSTEM
Ernest F. Johnson, Princeton, N.J., assignor to the United States of America as represented by the United States Atomic Energy Commission
Filed Apr. 14, 1959, Ser. No. 806,407
14 Claims. (Cl. 204—154.2)

The present invention relates to a novel composition of matter and method for employing said composition as a heat transfer medium and as a source of tritium.

Tritium is an isotope of hydrogen having an atomic weight of 3. This isotope does not occur in nature and can only be obtained as a product of a nuclear transmutation process. In recent times it has been proposed to use tritium as a fuel to produce energy in a thermonuclear reaction in accordance with the following equation:

$$D + T \rightarrow He^4 + n + 17.6 \text{ mev.} \qquad (1)$$

Here a deuterium nucleus (D) undergoes fusion with a tritium nucleus (T) to produce a helium-4 nucleus and a neutron (n) with the release 17.6 mev. of energy. It has been proposed to utilize the energy from this and other fusion reactions to produce useful power. The design and construction of a thermonuclear reactor in which isotopes of light elements, such as deuterium and tritium, are caused to undergo nuclear fusion is described in copending applications S.N. 688,089, now U.S. Patent No. 3,016,341; 705,071, now U.S. Patent No. 3,002,912; 745,-778, now U.S. Patent No. 3,015,618, and 756,082 and U.S. Atomic Energy reports NYO 6047 and 7899. These references describe a particular kind of thermonuclear reactor, known as a stellarator. Briefly, a thermonuclear reactor of the stellarator class includes a container in which thermonuclear reactants are confined and in which thermonuclear reaction products are released in the form of energetic neutrons and high energy radiation. The container consists of an endless tube within which the thermonuclear reactants are converted in a zone of ionized particles called a plasma. This plasma is confined within the container by externally produced magnetic fields. The plasma is formed by first evacuating the container, introducing a gas of thermonuclear reactants therein and then ionizing said gas by a radiofrequency discharge. The plasma is then heated ohmically and magnetically until a thermonuclear reaction sustaining temperature is reached.

In any thermonuclear reactor which burns a mixture of deuterium and tritium, the resulting energetic neutrons which are produced carry off a large part of the released energy. The kinetic energy of the neutrons is converted to heat energy by collision with the materials surrounding the reaction tube. This heat is then transferred to a heat transfer medium surrounding at least a portion of the reaction tube in heat exchange relationship therewith. In the stellarator, a "blanket" is provided which contains two heat transfer fluids in heat exchange relationship with the reaction tube and with each other. In addition to serving as a heat transfer medium, each fluid has a separate and important function. The first fluid of the blanket is a neutron moderating material whose function is to reduce the energetic neutrons to thermal neutrons; the second fluid contains a source of the lithium-6 isotope and can be used to generate tritium by means of the following reaction:

$$n(\text{thermal}) + Li^6 \rightarrow T + He^4 + 4.8 \text{ mev.} \qquad (2)$$

The additional 4.8 mev. of energy is absorbed by the blanket surrounding the reaction tube. The heated blanket is then circulated to an external heat exchange system which, in turn, is connected to conventional apparatus for generating power. The lithium-containing part of the blanket, in addition, can be processed to effect recovery of the tritium produced by Reaction 2.

For an ideal blanket system to function as a heat transfer medium and as a tritium source, it must have the following characteristics:

Efficient recovery of thermal energy requires that the constituents of the blanket be mobile and have a high thermal capacity. In order to recover tritium in high yields, the lithium-containing part of the blanket should be free of protons so that the possibility of isotope exchange between hydrogen and tritium is minimal. Preferably, the tritium should combine rapidly to form a single compound on release from the lithium and that compound should be readily separable from the lithium-containing blanket. Furthermore, the tritium-containing compound should be readily decomposed to form the desired pure tritium. For minimal corrosive attack the materials comprising the blanket system should be relatively non-reactive with its containing walls at temperatures of at least 300° C. It is highly desirable that the blanket fluids be unreactive with each other. Minimal safety hazards require that the blanket constituents be chemically stable and non-toxic.

For efficient circulation of the blanket system, it is desirable that the flowing fluid be of low viscosity and homogeneous. It is particularly desirable that the flowing fluids be electrically non-conductive so that minimum pumping power is required to circulate it through a magnetic field. The fluids should have low melting points and low vapor pressures at blanket operating conditions.

It has been proposed to use molten lithium metal as the source of tritium and water as the neutron moderator in a blanket system for a thermonuclear reactor. However, this system has been found to have a number of disadvantages. The lithium metal has been found to interact with the magnetic fields associated with the thermonuclear reactor to cause a flow of current in the lithium. The magnetic field produced by the current is directed in such a manner as to oppose the circulation of the lithium. It would require a large amount of pumping power to overcome this opposing force thus substantially reducing the net yield of energy available for recovery from the circulating molten lithium. Because the molten lithium cannot be circulated with efficiency, the recovery of the tritium produced by neutron capture of the molten lithium in accordance with Equation 2 is economically and technically impractical. An additional disadvantage is the extremely high chemical reactivity of molten lithium with water. This reaction is similar to the highly explosive reaction of sodium with water.

It is a principal object of the present invention to provide a circulating lithium-containing blanket system for a neutron source wherein said blanket system functions efficiently both as a heat transfer medium and as a source of tritium.

Another object of the present invention is to provide a circulating lithium-containing blanket system for a neutron source having a magnetic field associated therewith, said blanket serving simultaneously and efficiently as a heat transfer medium and as a source of tritium.

A further object of the present invention is to provide a lithium-containing composition and an efficient method for utilizing said composition to obtain tritium.

Still another object of the present invention is to provide a method of recovering tritium from the nuclear reaction product of a lithium-6 containing material and the fusion neutrons of deuterium and tritium.

These and other objects and advantages of the present invention will be best understood from the following description taken in conjunction with the accompanying drawings in which.

In accordance with the present invention, I provide a blanketing system consisting of a molten lithium-salt and a separately confined fluid neutron moderator. When this system is employed with a suitable neutron source, the neutron kinetic energies may be converted to useful heat. Concurrently, the lithium-containing portion of the blanket produces tritium which, as will be shown, can be separated as a pure product.

The neutron moderator can be water or a radiation-resistant organic liquid. Water is particularly desirable because of its high electrical resistance, its good moderating property and its small capture cross-section for neutrons. Also structural materials are readily available for containing and resisting the corrosive effects of the high steam pressure of hot water.

The molten-lithium salts are enriched in the lithium-6 isotope and is selected from lithium nitrite and/or lithium nitrate to form the tritium-producing constituent of my blanket composition. By using the aforesaid lithium salts the disadvantages of using metallic lithium are overcome. The electrical resistance of these salts is sufficiently high so that they can be moved across magnetic field lines without requiring tremendous pumping power. Furthermore, the tritium produced in the lithium-containing portion of the system can be readily separated as will be seen from the following description. Still another advantage of using these salts is that the reaction of any of these lithium salts with water does not lead to an explosive reaction as is the case when molten liquid metal is contacted with water. Other advantages will become apparent as the description proceeds.

Figure 1:
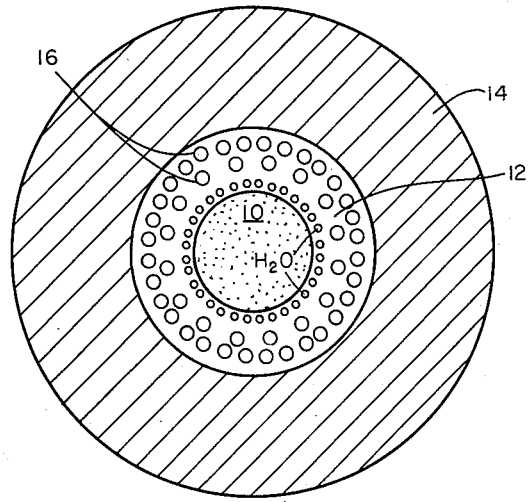
FIGURE 1 is a representative section of a stellarator taken perpendicular to the reaction tube axis showing the reaction tube, neutron blanket and magnet coil.
Figure 2:
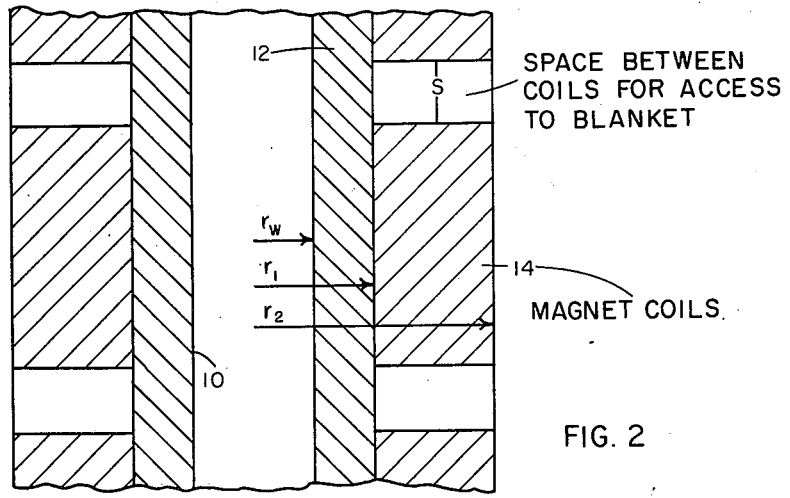
FIGURE 2 is a representative section of a stellarator taken parallel to and along the axis of the reaction tube showing how the magnet coils, blanket and reaction tube are arranged relative to each other to provide access to the lithium-containing blanket

In order to understand the operation of this invention as an improved heat transfer blanket system, reference is made to FIGURES 1 and 2 which show the relationship of the reaction tube of a stellarator, its confining magnetic field and its blanket system. The reaction tube 10 in which the plasma is formed and in which thermonuclear Reaction 1 takes place, has a radius $r_w$ and is surrounded by an annular neutron blanket 12 of thickness $r_1-r_w$. This, in turn, is surrounded by the magnet coils 14 of inner radius $r_1$, and outer radius $r_2$. These coils are not continuous along the length of the stellarator reaction tube 10, but are separated by a distance S to permit access to the blanket 12 for removal of the heat transfer media therein. The blanket consists of a close-packed concentric array of steel pipes 16 with the water and lithium salts flowing inside the pipes. Pipe arrays other than that shown in FIGURE 1 may also be used. The first row of water-containing pipes is followed by alternate layers of pipes containing the lithium-6 enriched salts in one layer followed by layers of pipes containing water.

The energy developed by the stellarator is essentially all found in the form of kinetic energy of nuclear particles. The major fraction of the energy appears as kinetic energy of the primary neutrons liberated by Reaction 1 above. A second fraction appears as kinetic energy of charged nuclear particles and as soft X-rays. The neutron kinetic energy is absorbed by the blanket. In addition, the neutrons are moderated by the water and a moderated neutron reacts with a lithium atom as in Equation 2 above, to release an additional amount of energy. Assuming that Reaction 1 is the dominant thermonuclear reaction then it has been determined that about 68% of the total energy is absorbed in the water and the remaining 32% in the lithium.

The utilization of the heat produced is conventional after the heat is removed from the stellarator. In one case the stellarator energy developed in the molten lithium salts can be used to superheat the steam developed by the stellarator energy in the water loop. Alternatively, steam may be formed by transferring the energy in the molten lithium salt loop to an external coolant. The resulting steam can then be used in conjunction with a turbine and electric-generator to produce useful power.

In order to understand the operation of this invention as it applies to the recovery of tritium, reference will be made to FIGURE 3 which is a flow sheet illustrating the sequence of operations used to separate tritium from the lithium-6 containing portion of the blanket. The tritium recovery process will be described with reference to a feed stream consisting of molten lithium nitrite enriched in the lithium-6 isotope and a small quantity of beryllium oxide (5–10 weight percent).

Optimally it is desirable to produce as much tritium as is consumed in the reactor tube 10 of FIGURE 1. This could be done if every neutron produced from Equation 1 in the reaction tube would be moderated to thermal energies and captured by the lithium-6 to produce tritium in accordance with Equation 2. Physically this is impossible for several reasons. A percentage of the neutrons inevitably leak out of and are lost from the blanket. The structural materials of the blanket absorb another fraction of the neutrons. Also, the water in the blanket can capture the neutrons instead of moderating them. This neutron loss can be at least partially offset by introducing a material that undergoes an n, 2n reaction.

Figure 3:
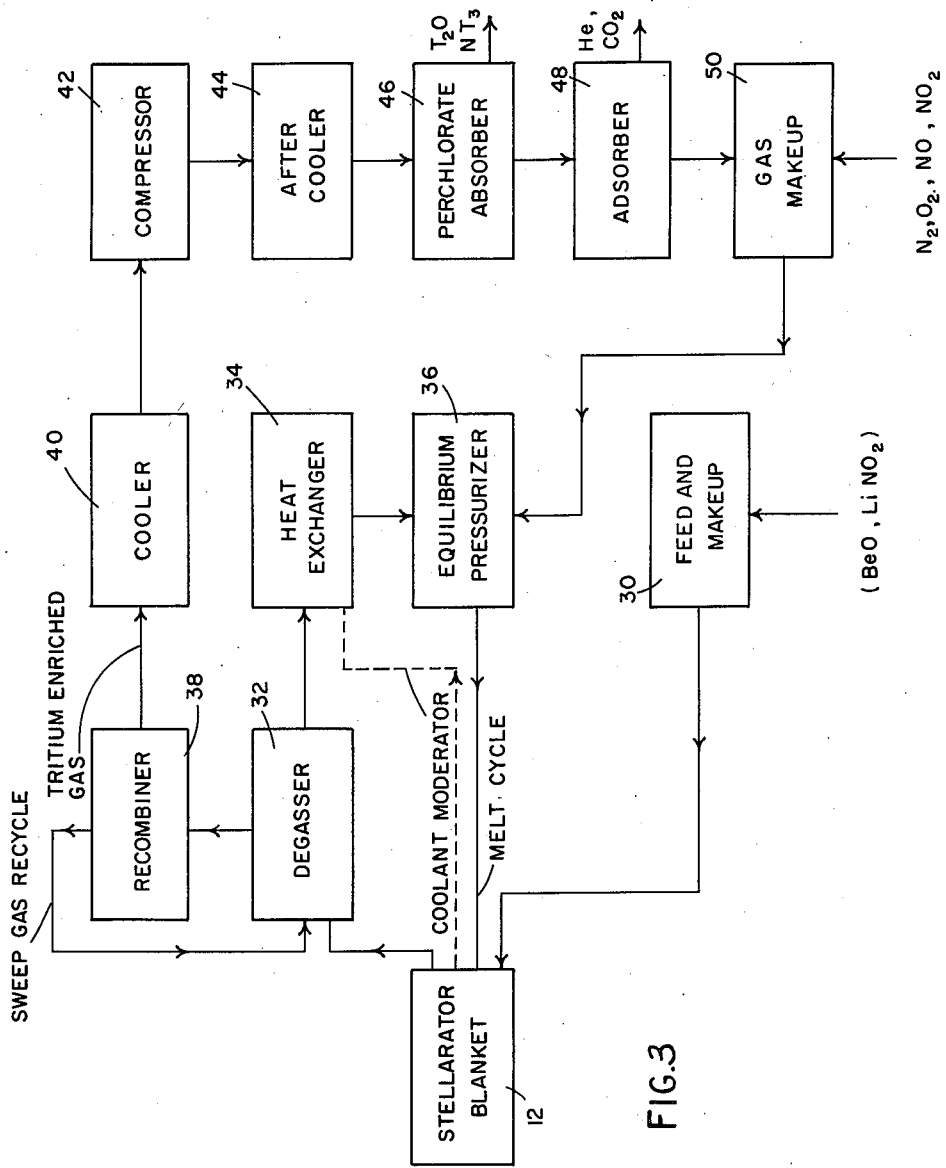
FIGURE 3 is a flow sheet showing a processing scheme for separating tritium from the tritium-laden blanket.

Referring now to FIGURE 3, a 5–10% by weight dispersion of beryllium oxide in molten lithium nitrite is prepared in chamber 30. This melt is then passed to stellarator blanket 12 (FIGURE 1). In the blanket 12, as shown in FIGURES 1 and 2, a portion of the heat generated occurs by virtue of the fusion reaction in reaction chamber 10 (FIGURE 1). In addition the neutrons produced by the fusion reaction (Equation 1) are moderated by the water in the blanket. The moderated neutrons react with the lithium-6 of the melt to produce tritium in accordance with Equation 2. During its residence in the blanket 12 the melt is heated to a temperature in the range 250–600° C. At this high temperature the lithium partially decomposes to form lithium oxide, $N_2$, $O_2$, $NO$, $NO_2$ and helium. The tritium containing melt leaves the blanket 12 to degasser 32, through jet injectors (not shown). The gaseous decomposition products of the lithium nitrate including tritium are disengaged from the melt and are passed to recombiner 38 where any free tritium is catalytically combined with $O_2$ to form tritiated water vapor. The gases in recombiner 38 are recycled to the degasser 32 where they sweep the melt free of tritium. When the recycled gas has reached a tritium concentration of approximately $10^{-2}$ volume percent, a small fraction is withdrawn as will presently be described.

After the melt has been swept of its tritium content, it passes to heat exchanger 34 where it gives up its heat to an external coolant or superheats the hot water (the moderating portion of the blanket) passing, as indicated by the dotted line, from the blanket 12 to heat exchanger 34. The cooled melt is then passed to an equilibrium pressurizer 36. The lithium melt entering the equilibrium pressurizer is saturated with respect to nitrogen, nitrogen oxides and oxygen and contains appreciable amounts of lithium oxide, $Li_2O$. Lithium oxide is one of the decomposition products of lithium nitrite. From the point of view of producing tritium, lithium oxide is not harmful. In fact it is beneficial since the lithium density of the oxide is greater than lithium metal. However, the presence of too much lithium oxide causes an adverse increase in the density and viscosity of the melt making it difficult to circulate through the system. Hence, the equilibrium pressurizer 36 the requisite amount of nitrogen oxides and oxygen is introduced from gas makeup chamber 50 to thereby convert most of the lithium oxide to lithium nitrite. The equilibrated melt in unit 36 is then recycled to blanket 12.

When the tritium concentration in degasser 32 and recombiner 38 has reached a concentration of $10^{-2}$ volume percent, a portion of this enriched gas is passed to cooler 40 and thence to compressor 42 to reduce the volume of the gas. The compressed gas is then passed to aftercooler 44 to remove the heat of compression. The tritium-oxide enriched gas, now considerably reduced in volume, is contacted at room temperature with an easily regenerated dehydrating agent in perchlorate absorber 46. An anhydrous alkaline earth perchlorate such as magnesium perchlorate has been found particularly desirable for this purpose. The perchlorate absorbs substantially all of the tritiated water and any ammonia brought in contact with it.

In order to separate the tritium from the perchlorate absorber, the hydrated and ammoniated perchlorate is heated to a temperature in the range 275–300° C. The tritiated water and ammonia thus separated can then be electrolyzed to recover gaseous tritium.

The exit gas from the perchlorate chamber 46 is substantially free of tritium and consists of nitrogen, oxygen, nitrogen oxides, oxides of carbon and helium. The carbon appears as result of the nuclear transmutation of nitrogen; helium is one of the products of the reaction given in Equations 1 and 2. The helium and oxides of carbon are moved from the process in adsorber 48. The nitrogen oxides are then passed to gas makeup unit 50. Additional nitrogen, oxygen and nitrogen oxides are added to the system through unit 50, as needed to maintain the desired equilibrium.

It is essential to the efficient operation of this system that virtually all of the tritium produced in the blanket be in the gas phase, rather than remain in the nitrate melt as dissolved water or as lithium tritoxide ($LiOH^3$). The solubility of water in lithium nitrate depends on the concentration of water in the gas phase which is in equilibrium contact with the nitrite and on the pressure and temperature of the system. At a concentration of 0.02 mole fraction water in the gas and a pressure in the degasser of 0.1 atmosphere, the solubility of water in the nitrite at 400° C. is less than $10^{-5}$ mole fraction. This corresponds to an inventory of less than .5 kilogram in a blanket containing $10^5$ kilogram lithium. As the temperature is increased above 400° C. the solubility of water in the melt is still further reduced.

The formation of $LiOH^3$ in the molten lithium nitrite takes place according to the following reaction:

$$2LiNO_2 + H^3_2O \rightarrow 2LiOH^3 + NO + NO_2$$

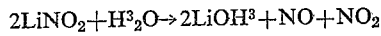

In order to minimize the formation of $LiOH^3$ the concentration of NO and $NO_2$ or of $N_2$ and $O_2$ should be large relative to the concentration of water. At 600° C. the mole fraction of $LiOH^3$ will be of the order of $10^{-10}$ at a total pressure of about .1 atmosphere while the mole fraction of lithium nitrite will be nearly unity. Lower temperatures may be used subject to the condition that the concentration of $LiOH^3$ is minimal with respect to the concentration of water.

I have described a tritium recovery system using lithium nitrite with water as moderator. However, a blanket system using lithium nitrate, an equilibrium mixture of lithium nitrite and lithium nitrate or a slurry of lithium oxide, $Li_2O$, in equilibrium with lithium nitrate and/or lithium nitrite may also be used to provide an economical tritium recovery process. In the case where lithium oxide slurries are used care should be exercised to insure that the concentration of the lithium oxide is not so concentrated as to form an overly viscous system, thus causing circulation difficulties. In each case the blanket should include a neutron multiplier element or compound to offset neutron losses.

While I have described my invention in connection with a composition useful in deriving power and recovering tritium from the energetic neutrons produced in a thermonuclear reaction, it should be understood that my invention is equally useful for deriving power and producing tritium from other sources of neutrons such as those coming from a nuclear reactor. The design and construction of some nuclear reactors in which the heat transfer and tritium producing compositions of my invention may be used with advantage is disclosed in U.S. Patent 2,708,656.

Since many embodiments might be made of the present invention and since many changes might be made in the embodiment described, it is to be understood that the foregoing description is to be interpreted as illustrative only and not in a limiting sense.

I claim:

1. A heat transfer, tritium-producing system comprising in combination with a source of energetic neutrons, a circulating heat transfer medium consisting of two separately confined fluids in heat exchange relationship with and positioned to intercept said energetic neutrons, one of said fluids containing water as a neutron moderating material and the other containing a lithium-6 enriched fused salt selected from the group consisting of lithium nitrite, lithium nitrate, a mixture of said salts, a mixture of each of said salts with lithium oxide, and a mixture of said salts with each other and with lithium oxide.

2. A heat transfer, tritium-producing system comprising in combination with a source of energetic neutrons, a circulating heat transfer medium consisting of two separately confined fluids in heat exchange relationship with and positioned to intercept said energetic neutrons, one of said fluids containing water as a neutron moderating material and the other containing a lithium-6 enriched fused salt selected from the group consisting of lithium nitrite, lithium nitrate, a mixture of said salts, a mixture of each of said salts with lithium oxide, and a mixture of said salts with each other and with lithium oxide and beryllium oxide as a neutron multiplying material which forms neutrons by virtue of an n, 2n nuclear reaction.

3. A heat transfer tritium producing system comprising in combination with a source of energetic neutrons, a circulating heat transfer medium consisting of two separately confined fluids in heat exchange relationship with each other and positioned to intercept said energetic neutrons, one of said fluids comprising water as a neutron moderating material and the other said fluid containing a fused salt mixture of molten lithium nitrite and lithium oxide, said lithium oxide being present in sufficient amount to allow circulation of said fused salt mixture.

4. The system of claim 3 wherein the fused salt mixture also contains a beryllium oxide compound which has a minimal capture cross section for neutrons.

5. A method of converting the kinetic energies of neutrons to utilizable thermal energy and tritium which comprises circulating a heat transfer medium consisting of two separately confined fluids in energy exchange relationship with a source of energetic neutrons, one of said fluids containing a neutron-moderating material and the other containing a lithium-6 enriched fused salt selected from the group consisting of lithium nitrite, lithium nitrate, a mixture of said salts, a mixture of each of said salts with lithium oxide, and a mixture of said salts with each other and with lithium oxide, to thereby moderate the energetic neutrons to neutrons of thermal energy thereby heating said moderator, absorbing at least a portion of said thermal neutrons in said fused salt to thereby convert at least a portion of the lithium-6 therein to tritium and heat said fused salt.

6. The method according to claim 5 wherein the fused salt contains a neutron multiplying material.

7. A method for producing tritium which comprises circulating a lithium-6 enriched fused salt through a zone of thermal neutrons to thereby convert said lithium-6 to tritium, said fused salt being selected from the group consisting of lithium nitrite, lithium nitrate, a mixture of said salts, a mixture of each of said salts with lithium oxide, and a mixture of said salts with each other and with lithium oxide, and thereafter separating the tritium from said fused salt.

8. The method according to claim 7 wherein said fused salt contains beryllium oxide as a neutron-multiplying material.

9. A method for producing tritium which comprises circulating lithium-6 enriched mixture of lithium nitrite and lithium oxide through a zone of thermal neutrons to thereby convert at least a portion of the lithium-6 in said mixture to tritium, converting the tritium in said salt to tritiated water vapor, removing the tritiated water vapor from said fused salts, and thereafter converting the said tritiated water to tritium gas.

10. The method according to claim 9 wherein the fused salt contains beryllium oxide as a neutron-multiplying material.

11. A method for producing tritium which comprises circulating a mixture comprising a slurry of lithium oxide in molten lithium nitrite in equilibrium with a gas containing the gaseous decomposition products of lithium nitrite through a zone of thermal neutrons to convert at least a portion of the lithium-6 isotope to tritium, converting the tritium to tritiated water vapor, separating the tritiated water vapor from said slurry into said gas, contacting the gas containing said tritiated water vapor with an anhydrous regenerative dehydrating agent to selectively remove the tritiated water vapor therefrom, regenerating the dehydrating reagent to recover the tritiated water vapor as the final product.

12. The method according to claim 11 wherein the recovered tritiated water vapor product is electrolyzed to form tritium gas.

13. The method according to claim 11 wherein the dehydrating agent is an anhydrous alkaline earth perchlorate.

14. The method according to claim 11 wherein the slurry contains beryllium oxide as a neutron-multiplying material.

References Cited in the file of this patent

FOREIGN PATENTS

| | | |
|---|---|---|
| 656,398 | Great Britain | Aug. 22, 1951 |
| 1,174,700 | France | Nov. 3, 1958 |

OTHER REFERENCES

A.N.L. 5840 by D. M. Gruen, pages 2–7 (copy in Library).

Nuclear Engineering, Part II, pub. by American Inst. of Chemical Engineers, No. 12 (1956), vol. 50, pages 113–119.

Proceedings of the Second United Nations International Conference on the Peaceful Uses of Atomic Energy, vol. 32, United Nations, Geneva, 1958, pages 440–444.